Patented Sept. 6, 1938

2,129,222

UNITED STATES PATENT OFFICE 2,129,222

PROCESS FOR THE RECOVERY OF A SOLUBLE PROTEIN POWDER FROM WHEY

Abraham Leviton, Washington, D. C., assignor to Secretary of Agriculture of the United States of America, and his successors in office No Drawing. Application April 16, 1937, Serial No. 137,286

6 Claims. (Cl. 99—19)

(Granted under the act of March 3, 1883, as amended April 30, 1928; 370 O. G. 757)

This application is made under the act of March 3, 1883, as amended by the act of April 30, 1928, and the invention herein described and claimed may be used by and for the Government of the United States or any of its officers and employees, in the prosecution of work for the Government, without the payment to me of any royalty thereon.

When the casein is removed from milk by the action of rennet, as in cheese making, or by acid, as in making cottage cheese or casein, the whey remaining contains small amounts of fat which may be removed by centrifugal separation, leaving a clear solution containing lactose (4.6–5.0%), salts (0.37–0.65%), and soluble proteins (0.80–0.95%).

The lactose in the whey has a commercial value. The proteins have a commercial value. The lactoflavin contained in the whey in minute quantities possesses a potential commercial value.

In the commercial manufacture of lactose, the usual procedure is to coagulate the greater part of the protein by heat, separate the precipitate by decantation, and filtration, and concentrate the filtrate under vacuum until the lactose crystallizes. The crystals are removed by centrifuging, and are purified by a second crystallization. By this method about 50% of the sugar is recovered. The proteins are denatured by the heating, and are no longer soluble.

It is possible to adjust the reaction and temperature so that the sugar can be crystallized without removing the protein, and without rendering it insoluble. If this is done the mother liquor, after removal of the sugar, may be dried to a powder, usually designated as whey protein powder, containing 37–52% lactose, 32–45% protein, and 12–18% ash. Some of the salts may be removed from this powder by dialyzing, thus increasing the proportion of protein and lactose.

It would be advantageous from a commercial standpoint to develop a process so that (1) a greater yield of lactose would be obtained; (2) a lactose of high purity would be obtained as a result of but one crystallization; and (3) the protein could be separated from part of the lactose and salts without impairing its solubility, and nutritive properties.

I have discovered that any or all of these ends may be obtained by treating raw, concentrated or dried whey with an alcohol-water solution. My invention is based upon the following observations:

(1) If to an aqueous solution containing lactose, sufficient alcohol is added to precipitate most of the lactose, there is a lag between the time of the addition of the alcohol, and the precipitation of the lactose. The resulting solution, in other words, remains supersaturated with respect to the lactose for an appreciable interval.

(2) The lactose in the powder derived from milk, and milk derivatives, exists in an amorphous rather than a crystalline form. In other words, the lactose in these powders is present in a highly concentrated aqueous solution. This state of the lactose is commonly designated as the glassy state, and for all practical purposes, the lactose in this state may be considered to be in solution; and consequently the powders containing lactose in this state may be considered to contain the lactose in solution.

(3) Alcohol-water mixtures, containing the solid ingredients of whey, when sufficiently high in their alcoholic content, will contain the protein ingredients of whey in an insoluble, undenatured state. The protein may be readily recovered from these mixtures, and may readily be resuspended in water to give a stable suspension.

(4) These alcohol-water mixtures will dissolve the salts contained in whey to such an extent that the saltines of whey powder or of whey protein powder may be considerably reduced.

(5) The solubility in alcohol of the protein and of the calcium salts of whey may be increased by the addition of small quantities of hydrochloric acid.

I make use of any or all of these observations in my invention. For example, I find that at room temperature, a solution containing four parts by volume of 95% alcohol, and one part by volume of water, when added to ten parts by weight of whey powder, dissolves apparently a much larger portion of lactose than that sufficient to form a saturated solution. The stability of this supersaturated solution is great enough to permit of its filtration from any undissolved material. I also find that the same alcohol-water solution dissolves very little protein, and leaves the undissolved whey protein undenatured. I find further that the salts responsible for the saltiness of the whey powder are partly removed by the same alcohol-water mixtures.

This experiment may be repeated, and whey protein powder may be used instead of whey powder with substantially the same results as cited above. The experiment may be repeated again, and skim milk powder may be used instead of whey powder with substantially the same results. The casein contained in the skim milk powder, however, is denatured.

These experiments may be modified in order that raw and concentrated whey, whey protein powder solutions, and skim milk may be used instead of the corresponding powders.

Under these circumstances, sufficient 95% alcohol is added to give the proportions of alcohol and water cited in the discussion of the treatment of the various powders.

The ratio of alcohol to water cited is at room temperature the ratio above which the whey protein remains undenatured and below which it becomes denatured. I find that the results of these experiments may be employed separately or in combination, in order to recover from raw, concentrated and dried whey, from raw, concentrated and dried skim milk, and from whey protein powder and solutions containing it: A water soluble protein powder with a lower lactose and salt content than that obtained by any method yet devised.

Solvent regeneration in the case of the extraction from powders depends only upon filtration and acid neutralization in the event that the recovery of a soluble protein powder low only in its lactose content is the primary consideration; where the recovery of soluble protein powder, low both in the degree of saltiness and in its lactose content, is the object, straight distillation is necessary. Solvent recovery in the case of extraction from solution may necessitate the use of fractional distillation equipment.

In the case of solvent regeneration by filtration there results in the mother liquor, upon its successive application, a gradual enrichment of its lactoflavin content, a fact which no doubt could be utilized to great advantage commercially.

It is also obvious that the invention is not necessarily limited to the use of alcohol-water solutions as a solvent. Other liquids miscible with water and forming solutions with water in which lactose and the whey protein are sparingly soluble may evidently be used. We prefer to use alcohol because of its low cost, its nontoxicity and its accessibility. It is also obvious that the invention is not necessarily limited to the use of alcohol-water mixtures in the proportions and at the temperature cited above and below. It is sufficient that the quantity of alcohol used should be great enough at any temperature to yield a solution which will not denature the lactalbumin and in which the lactose and protein is sparingly soluble.

The following are examples of the process under discussion:

(1) 100 grams of spray dried whey powder containing 66% lactose and approximately 13.5% nitrogenous material calculated as albumin were stirred for three minutes in a solution consisting of 1,430 c. c. of 95% alcohol and 357 c. c. water. On filtration, a residue, designated for the purpose of this specification as protein powder, was obtained which contained approximately 50% oven dry solids. This residue was washed with three volumes of absolute alcohol to permit the drying of the powder under conditions such that the concentration of alcohol in the powder remained constant during evaporation. The air dried powder constituting approximately 30% of the whey powder, was found to contain upon analysis 27% lactose, 35.2% protein and 13.4% ash. The powder was soluble in water (approximately 10% of the powder consisted of colloidal calcium salts, and protein which when the powder was dissolved in water could be filtered to leave a clear filtrate). Solutions of the protein powder exhibited remarkable whipping properties. These solutions had a pleasant taste free from the decidedly cheese-like flavor, and saltiness of the original whey powder.

(2) 30 grams of the same whey powder described in (1) were stirred in three liters of 95% alcohol at 60° C. for one minute. On filtration, a residue was obtained, which when dried in air, exhibited the same properties as those of the protein powder described in (1).

(3) When untreated or concentrated whey is used, alcohol is added to give the proper ratio of alcohol and water. In the following example 58 grams of concentrated whey, from which the casein and part of the colloidal calcium salts had been filtered, were mixed with 285.6 c. c. of 95% alcohol, and 167.0 c. c. water, and the mixture was filtered immediately thereafter. As a result of the filtration a residue was obtained which when washed with absolute alcohol and dried exhibited practically the same properties as those of the protein powder described in (1).

(4) When 5 grams of whey protein powder containing 33.5% lactose and 31.7% nitrogenous material calculated as protein was treated with a solution containing 80 c. c. of 95% alcohol, and 20 c. c. water, a whey protein powder was obtained upon filtration containing 43.1% protein and 8% lactose. The saltiness of a ten per cent solution of this powder compared to the saltiness of a ten per cent solution of the original powder was hardly apparent.

Having thus described my invention, what I claim for Letters Patent is:

1. A process for the recovery from whey of an undenatured soluble protein powder which comprises adding to whey powder, a solution of alcohol in water at room temperature containing at least 4 parts by volume of 95% alcohol to 1 part of water, agitating the mixture until supersaturation with respect to lactose just reaches a maximum, thence rapidly filtering, recovering the residue and drying.

2. A process for the recovery from whey of an undenatured soluble protein powder which comprises adding to concentrated whey sufficient alcohol and water at room temperature to give a mixture containing at least 4 parts by volume of 95% alcohol to 1 part of water, agitating the mixture until supersaturation with respect to lactose just reaches a maximum, thence rapidly filtering, recovering the residue and drying.

3. A process for the recovery from whey of a soluble whey protein powder which comprises adding to whey protein powder a solution of alcohol in water containing at least 4 parts by volume of 95% alcohol to 1 part of water, agitating the mixture until supersaturation with respect to lactose just reaches a maximum, thence rapidly filtering, recovering the residue and drying.

4. A process for the recovery from whey of a soluble protein powder which comprises adding to a concentrated solution of whey protein powder, sufficient alcohol and water to give a mixture containing at least 4 parts by volume of alcohol to 1 part of water, agitating the mixture until supersaturation with respect to lactose reaches a maximum, thence rapidly filtering, recovering the residue and drying.

5. A process for the recovery from skim milk of an undenatured solution of soluble protein powder which comprises adding to skim milk powder a solution of alcohol in water at room temperature containing at least 4 parts by volume of 95% alcohol to 1 part of water, agitating the mixture until supersaturation with respect to lactose just reaches a maximum, thence rapidly filtering, triturating the residue with water, filtering, and recovering filtrate.

6. A process for the recovery from skim milk of an undenatured solution of soluble protein powder which comprises adding to concentrated skim milk sufficient alcohol and water at room temperature to give a mixture containing at least 4 parts by volume of 95% alcohol to 1 part of water, agitating the mixture until supersaturation with respect to lactose just reaches a maximum, triturating the residue with water, filtering, and recovering the filtrate.

ABRAHAM LEVITON.